(12) United States Patent
Ritter et al.

(10) Patent No.: US 10,176,146 B2
(45) Date of Patent: Jan. 8, 2019

(54) INTEGRATION PATTERN IMPLEMENTATIONS USING RECONFIGURABLE LOGIC DEVICES

(71) Applicant: SAP SE, Walldorf (DE)

(72) Inventors: Daniel Ritter, Heidelberg (DE); Jonas Dann, Karlsruhe (DE)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 15/382,468

(22) Filed: Dec. 16, 2016

(65) Prior Publication Data

US 2018/0157618 A1    Jun. 7, 2018

Related U.S. Application Data

(60) Provisional application No. 62/430,641, filed on Dec. 6, 2016.

(51) Int. Cl.
*G06F 15/78* (2006.01)
*G06F 15/177* (2006.01)
*G05B 19/05* (2006.01)
*G05B 19/045* (2006.01)

(52) U.S. Cl.
CPC ....... *G06F 15/7871* (2013.01); *G05B 19/056* (2013.01); *G06F 15/177* (2013.01); *G05B 19/045* (2013.01)

(58) Field of Classification Search
None
See application file for complete search history.

(56) References Cited

PUBLICATIONS

Abhishek, Mitra, et al., "Boosting XML Filtering with a Scalable FPGA-based Architecture", CIDR 2009, (2009), 9 pgs.
Agrawal, Jagrati, et al., "Efficient Pattern Matching over Event Streams", Proceedings of the 2008 ACM SIGMOD International Conference on Management of Data, (2008), 147-160.
Caspi, Eylon, "Design Automation for Streaming Systems (PhD thesis)", Electrical Engineering and Computer Sciences University of California at Berkeley, (2005), 1-293.
(Continued)

*Primary Examiner* — Idriss N Alrobaye
*Assistant Examiner* — Dayton Lewis-Taylor
(74) *Attorney, Agent, or Firm* — Schwegman Lundberg & Woessner, P.A.

(57) ABSTRACT

Example embodiments of the present disclosure include an integration system comprising a machine-readable medium (e.g., a memory) and a reconfigurable logic device (e.g., an FPGA). The machine-readable medium stores configuration data that configures the reconfigurable logic device to include a first channel adapter, a first message processor, a second message processor, a message channel, and a second channel adapter. The first channel adapter is configured to receive input data written by a first message endpoint. The first message processor is configured to perform a first message processing operation on messages received from the first channel adapter that include the input data. The second message processor is configured to perform a second message processing operation on messages received from the first message processor. The message channel facilitates communication between the first and second message processors. The second channel adapter is configured to forward output data to a second message endpoint for further processing.

20 Claims, 12 Drawing Sheets

(56) References Cited

PUBLICATIONS

El-Hassan, Fadi, "Hardware Architecture of an XML/XPath Broker for Content-Based Publish/Subscribe Systems", Thesis submitted in partial fulfillment of the requirements for the degree of Ph.D. in Electrical and Computer Engineering, (2014), 271 pgs.

Floyd, Robert, et al., "Compilation of Regular Expressions into Integrated Circuits", Stanford Computer Science Dept. Report No. STAN-CS-80-798. Research sponsored by Advance Research Project Agency and National Science Foundation., (1980), 1-28.

Lee, Edward, et al., "Dataflow Process Networks", Proceedings of the IEEE. vol. 83, No. 5, (May 1995), 773-799.

Mueller, Rene, et al., "Data Processing on FPGAs", PVLDB, (2009), 910-921.

Muller, Rene, et al., "Streams on Wires—A query Compiler for FPGAs", PVLDB, (2009), 229-240.

Najafi, Mohammadreza, et al., "Con?gurable hardware-based streaming architecture using Online Programmable-Blocks", IEEE 31st International Conference on Data Engineering, (2015), 819-830.

Singh, Satnam, et al., "Kiwi: Synthesis of FPGA Circuits from Parallel Programs", Field-Programmable Custom Computing Machines. FCCM '08, (2008), 3-12.

INTEGRATION PATTERN IMPLEMENTATIONS USING RECONFIGURABLE LOGIC DEVICES

CROSS-REFERENCE TO RELATED APPLICATIONS

This application claims the benefit of U.S. Provisional Application No. 62/430,641, filed Dec. 6, 2016, entitled "Integration Pattern Implementations Using Reconfigurable Logic Devices," which is incorporated herein by reference in its entirety.

TECHNICAL FIELD

Example embodiments of the present application generally relate to field programmable gate arrays (FPGAs) and, more particularly, to implementing program integration semantics using FPGAs.

BACKGROUND

FPGAs are reconfigurable (e.g., reprogrammable) hardware devices for digital logic. FPGAs include an array of logic gates that can be configured to construct arbitrary digital circuits. These circuits are specified using either circuit schematics or hardware description languages such as Verilog or Very High Speed Integrated Circuit Hardware Description Language (VHDL). Existing commercial libraries provide a wide range of pre-designed cores, including those of complete CPUs. More than one core can be placed onto an FPGA chip. For evaluation and development purposes, FPGAs are often shipped soldered to a board with peripherals, such as external random access memory (RAM), network interfaces, or persistent storage.

The basic building blocks of FPGAs are Configurable Logic Blocks (CLBs). Each CLB has two slices that each contain Lookup Tables (LUTs) and Flip Flops (FFs). LUTs can be configured to implement arbitrary functions that map multiple bits to one bit. They can, for example, implement "AND" and "OR" gates. The FFs are used to store signals, but can only hold one bit each. For larger storage, Block RAM (BRAM) may be used. The CLBs and BRAM units are placed on the chip in a grid and connected over an interconnect fabric that spans the whole chip.

With growing, more complex IT landscapes, companies are relying on enterprise application integration (EAI) middleware to transport data among systems. Applications in the IT landscapes have different data formats for sharing data, but only unlock their full potential when integrated. Hence, this information has to be transformed, altered, and routed between the applications in order to get from a source to its destination system.

Recently, with the rise of mobile computing, the cloud, and the internet of things (IoT), the number of devices and applications producing data is increasing to meet the vision of connecting every object in the real world. As a consequence, EAI is facing immense amounts of data to be processed. As integration systems are the middleware among the applications in a system landscape, the throughput of such a system is critical for the whole landscape. While the usage of modern hardware such as FPGAs in related domains such as query and event processing led to positive results in terms of low latency, the effect on application integration and throughput has not yet been considered.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
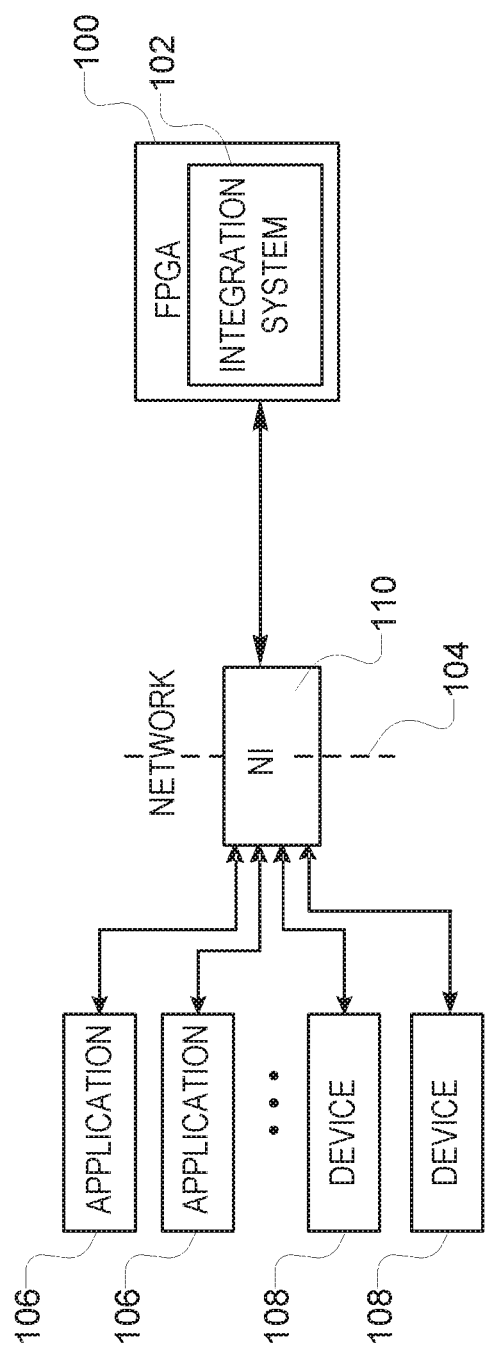
FIG. 1 is a network diagram illustrating a network environment in which an FPGA configured as a network-attached integration system may be deployed, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve an integration system implemented using reconfigurable logic devices. Example embodiments relate to integration semantics of message-oriented integration systems and enterprise integration patterns (EIPs). In particular, in example embodiments, program integration semantics (e.g., message routing and transformation) in the form of EIPs are implemented on top of one or more reconfigurable logic devices (e.g., FPGAs) using modular hardware implementations as templates that are synthesized to circuits. Each template allows for integration of various EIPs, and templates may be integrated together within an integration pipeline on one or multiple interconnected reconfigurable logic devices (e.g., interconnected FPGAs).

Example embodiments include an integration system comprising a machine-readable medium (e.g., a memory) and a reconfigurable logic device (e.g., an FPGA). The machine-readable medium stores configuration data that configures the reconfigurable logic device to include a first channel adapter, a first message processor, a second message processor, a message channel, and a second channel adapter. The first channel adapter is configured to receive input data written by a first message endpoint. The first message processor is configured to perform a first message processing operation on messages received from the first channel adapter. The second message processor is configured to perform a second message processing operation on messages received from the first message processor. The message channel facilitates communication between the first and second message processors. The second channel adapter is configured to forward output data to a second message endpoint for further processing.

Example embodiments also include a method for implementing an integration system on a reconfigurable logic device. The method includes loading configuration data at the reconfigurable logic device. The method further includes: implementing a first channel adapter on the reconfigurable logic device in accordance with the configuration data; implementing a first message processor on the reconfigurable logic device in accordance with the configuration data; implementing a second message processor on the reconfigurable logic device in accordance with the configuration data; implementing a message channel on the reconfigurable logic device in accordance with the configuration data; and implementing a second channel adapter on the reconfigurable logic device in accordance with the configuration data.

Example embodiments further include a machine-readable medium storing configuration data that causes a reconfigurable logic device to perform operations comprising: implementing a first channel adapter on the reconfigurable logic device in accordance with the configuration data; implementing a first message processor on the reconfigurable logic device in accordance with the configuration data; implementing a second message processor on the reconfigurable logic device in accordance with the configuration data; implementing a message channel on the reconfigurable logic device in accordance with the configuration data; and implementing a second channel adapter on the reconfigurable logic device in accordance with the configuration data.

With reference to FIG. 1, a reconfigurable logic device, in the example form of an FPGA 100, configured as a network-attached integration system 102, is shown. The FPGA 100 communicates over a network 104 (e.g., Ethernet network) with integrated applications 106 and devices 108. In some instances, the connection to the network 104 may be a wired connection, for example an Ethernet link, and the network 104 may be a local area network (LAN), a wide area network (WAN), the Internet, or another packet-switched data network. In other instances, the network 104 may, for example, include one or more wireless access points coupled to a LAN, a WAN, the Internet, or another packet-switched data network. Data traffic will enter the FPGA 100 over a network interface (NI) 110. Afterwards, the data may be processed by the integration system 102 and forwarded to one of the integrated applications 106 or devices 108 over the network 104 via the NI 110.

In an alternative embodiment, the FPGA 100 may be used as a co-processor, where the FPGA 100 gets its data from a software program. While the integrated applications 106 and devices 108 communicate with the integration system 102 over the network 104, the co-processor setup may involve deserializing the data in the software and thereafter serializing the data again to be transmitted to the FPGA 100. Hence, the FPGA 100 connected to the network 104 can work directly with data on the network 104, thereby saving a detour through the software.

It shall be appreciated that although some embodiments of the present subject matter are described as utilizing FPGA hardware, the inventive subject matter is not limited to deployment on FPGA hardware, and in other embodiments, the inventive subject matter may be deployed on other types of reconfigurable logic devices such as, for example, an application-specific integrated circuit (ASIC).

Example Integration Semantics

Integration semantics of the integration system 102 may be described by a message, a message channel, at least one channel adapter, and an ordered (possibly empty) set of transformation or routing patterns that process the message. A message may include: a unique identifier for identifying the message and enabling provenance along the different processing steps; a set of name/value pair header entries including metadata about the message; and the actual data being transferred, which is referred to as the message body or the message payload. In a simple example, a message body includes a string or a number. In a more complex example, the message body includes an XML and JSON document. In the context of message processing on FPGA hardware, a message includes a stream of bytes, which gets metadata assigned on entering the FPGA 100 via the NI 110. For example, the message may be assigned a unique message identifier and a message length.

Figure 2:
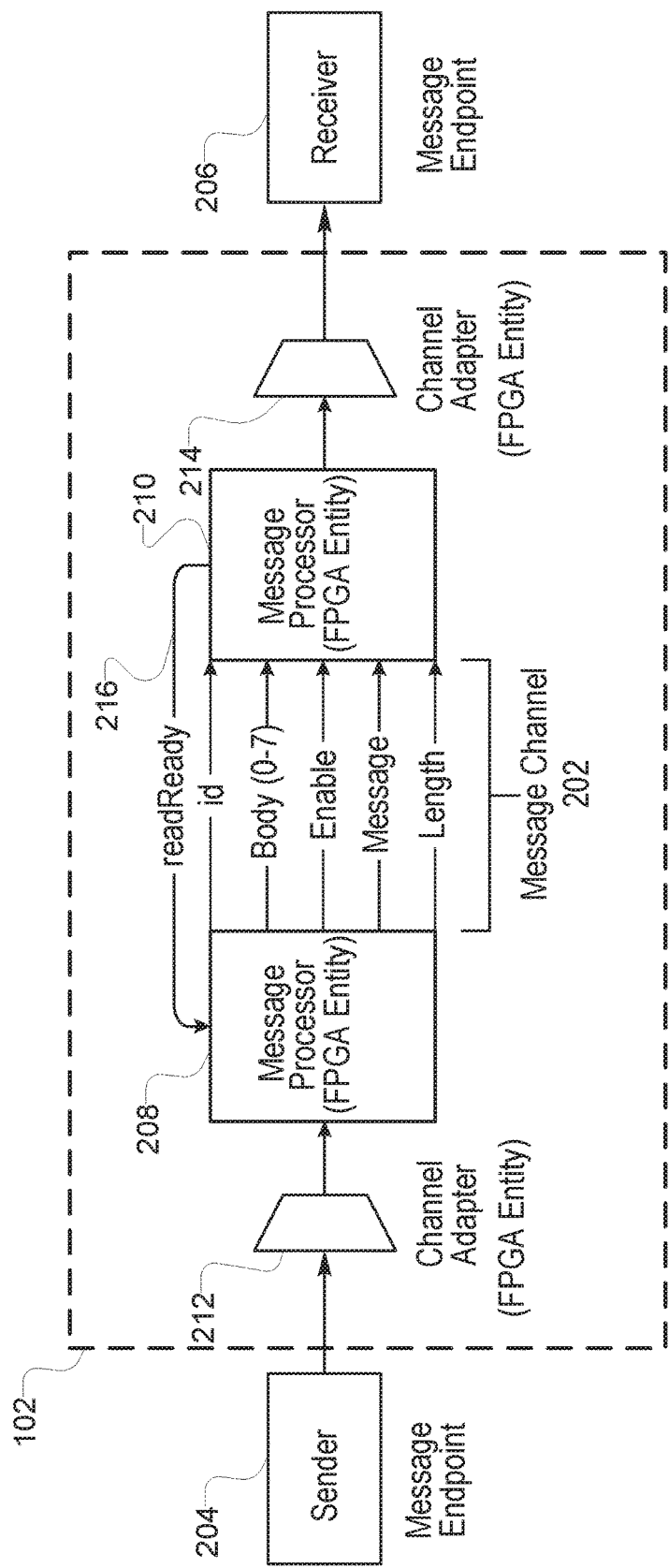
FIG. 2 is a block diagram illustrating integration semantics of the network-attached integration system, according to an example embodiment

FIG. 2 is a block diagram illustrating integration semantics of the network-attached integration system 102, according to an example embodiment. As shown in FIG. 2, a message channel 202 decouples sending and receiving endpoints or operations and facilitates the communication between them. A message endpoint 204 (e.g., a sending endpoint) writes data to the message channel 202, while a message endpoint 206 (e.g., a receiving endpoint) reads the data for further processing. The message endpoints 204 and 206 may each correspond to one of the integrated applications 106 or devices 108. The message channel 202 includes several data lines (e.g., hardwired connections) to facilitate communication between a message processor 208 and a message processor 210. One or more signals (e.g., bits) may be communicated on each data line. For example, the message channel 202 is illustrated to include: an id line for communicating an id signal corresponding to a unique identifier of the message; a length line for communicating a length signal corresponding to a length of the message; multiple message body data lines (e.g., 0-7) for communicating the message body that includes the input data received from the message endpoint 204; a message line for communicating a signal providing an indication that a message is being sent over the message channel 202; and an enable line for communicating a signal to indicate when valid data is on the message channel 202. With reference to the data line, a message with a size of 8 bits may be transported one byte at a time over the line. To indicate that a message is being sent over the message channel 202, a signal on the message line is set to high ("1") when a message is being sent even if there is currently no valid data on the data line. A signal on the message line is set to low ("0") only between messages (e.g., when the message channel 202 is ready to receive another message). For the transport of data between the message processors 208 and 210, a signal on the enable line is set to high when valid data is on the data line and low when there is no valid data on the data line. The signals on the id and length data lines are constant when the signal on the message line is high.

Each of the message processors 208 and 210 may correspond to a particular EIP, which are discussed in further detail below. Accordingly, each of the message processors 208 and 210 is configured to perform processing operations (e.g., routing and transformation) on messages. A channel adapter 212 is used to receive the messages from the message endpoint 204. A channel adapter 214 is used to forward messages to the message endpoint 206. The channel adapters 212 and 214 are responsible for handling the protocol-specific aspects (e.g., TCP, UDP, HTTP) of message communication between the integration system 102 and message endpoints 204 and 206. Accordingly, the channel adapter 212 transforms input data received from the message endpoint 204 into messages, and the channel adapter 214 transforms messages into output data to provide to the message endpoint 206.

Additionally, the channel adapters 212 and 214 are responsible for handling back-pressure which is applied to them by the next message processor in the pipeline or applying back-pressure to the previous message processor. Further, because the messages in the integration system 102 have to be uniquely identifiable by their message identifiers, the channel adapter 212, which is responsible for generating messages by transforming incoming data, is also responsible for assigning identifiers to messages it generates. To this end, the channel adapter 212 may include or be connected to a global identifier generator (not shown), which generates consecutive identifiers. The channel adapter 212 may transmit a request signal (a vector of length n, where n is the number of connected channel adapters that can request identifiers) to the global identifier generator, and in return, the global identifier generator provides an identifier.

The message processors 208 and 210 and channel adapters 212 and 214 are considered entities implemented on portions of a reprogrammable logic device (e.g., FPGA hardware). For example, any one of the entities discussed herein or combinations thereof may be implemented on the FPGA 100. Accordingly, the FPGA 100 may be configured to include the message processors 208 and 210, the channel adapters 212 and 214, and the message channel 202 in accordance with configuration data created based on a hardware description language file (e.g., through a process of compiling, synthesizing, and placing and routing). The hardware description language file may, for example, be written in VHDL or Verilog. Further details regarding the process of configuring the FPGA 100 to include the message processors 208 and 210 and channel adapters 212 and 214 are discussed below with reference to FIG. 3, according to some example embodiments.

The FPGA hardware (e.g., FPGA 100) is able to stream in parallel using pipeline processing in a full streaming mode. However, because of the limitations in resources of the FPGA hardware (e.g., size of memory), the components of the integration system 102 (e.g., channel and patterns) are configured to be fully streaming-enabled. In this way, even messages bigger than available physical resources can be processed, which implies that less data has to be buffered, if not for flow control or pattern semantics.

The basic capability of the integration system 102 to protect overload situations and data corruption is flow control. A flow control technique known as back-pressure allows the message processors 208 and 210 (e.g., routing and transformation patterns) under high load to notify the sending operation or remote endpoint (e.g., via TCP back-pressure) about their situation. For instance, for TCP remote endpoints this could lead to the rejection of new connections.

For the back-pressure between the message processors 208 and 210 (e.g., no TCP support), messages cannot be rejected atomically because the stream might already be partially processed. Therefore, the integration system 102 utilizes an approach with first in, first out (FIFO) queues (not shown) in each of the message processors 208 and 210 that are used to buffer message data that cannot be immediately processed by the subsequent processor and thus ensure that no message data is lost. The FIFO queues may be implemented on hardware using FFs, BRAM, or built-in FIFOs. In some instances, the BRAM can be replaced by connected RAM to buffer larger messages.

The current message processor (e.g., message processor 210) may indicate its ability to process message data to its predecessor message processor (e.g., message processor 208) by communicating a signal (e.g., "1" for ready or "0" for not ready) on a readReady data line 216 of the message channel 202 to indicate an availability of the current message processor to process message data. For example, the message processor 210 may indicate to the message processor 208 that it cannot immediately process message data by setting a readReady signal on the readReady data line 216 to low ("0"). Further, if the queue limit of the FIFO queue in the message processor 208 is exceeded and the message processor 210 is not ready yet (e.g., readReady signal set to low), the message processor 208 notifies its predecessor message processor (not shown) by also setting its readReady signal on a second readReady data line (not shown) to low ("0").

Example Streaming Integration Patterns

Routing Patterns

The routing patterns are used to decouple individual processing steps so that messages can be passed to different processors depending on a set of conditions. Routing patterns include content-based routers, content filters, message filters, splitters, aggregators, load balancers, and join routers.

The content-based router and the message filter are semantically similar. In fact, the filter is a special case of the router. For example, the content-based router has a message channel cardinality of 1:n, and the filter has a message cardinality of 1:1. Further, both the filter and the content-based router are read-only (e.g., access the message, but do not change it) and non-message-generating (e.g., pass the original message).

The content-based router selects a message channel based on a condition that, in the worst case, may include fully reading the message (e.g., buffering). In one approach, the message corresponds to a data-based window. In an alternative approach, the message may be passed further into all output channels in parallel and filtered out later at a synchronization point. Since the output channel is selected based on a condition evaluated on the stream, the content-based router specifies a mapping from a message to a channel.

Figure 3A:
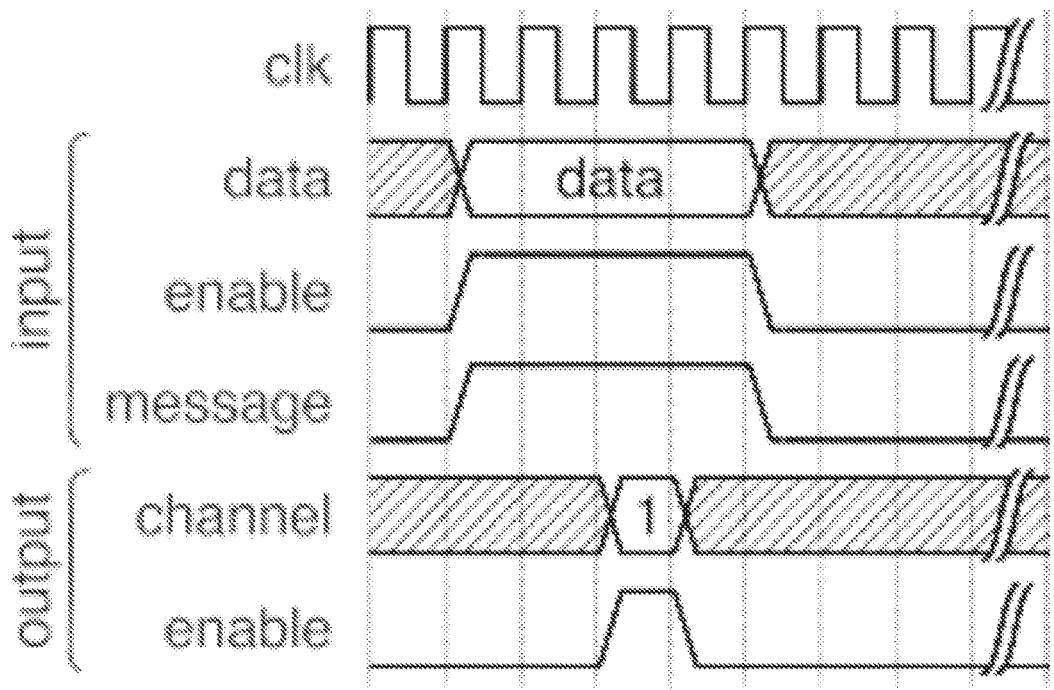
FIGS. 3A-3F are graphs illustrating semantics for integration patterns denoting different integration semantics, according to example embodiments.

FIG. 3A is a graph illustrating behavior of the content-based router, according to an example embodiment. More specifically, FIG. 3A shows high and low circuit settings for the different signals and data lines of the content-based router. The input denotes the message from the previous pattern. The output is the response from the user code. The clock cycles are denoted by silk. The channel is represented by an integer identifier. When a message enters the router (message and data signals high) and the data is valid (enable signal high), then the condition (e.g., the user code) is evaluated and the identifier of the selected channel is set and the enable signal enabled. The message will be routed according to the channel identifier.

Figure 3B:
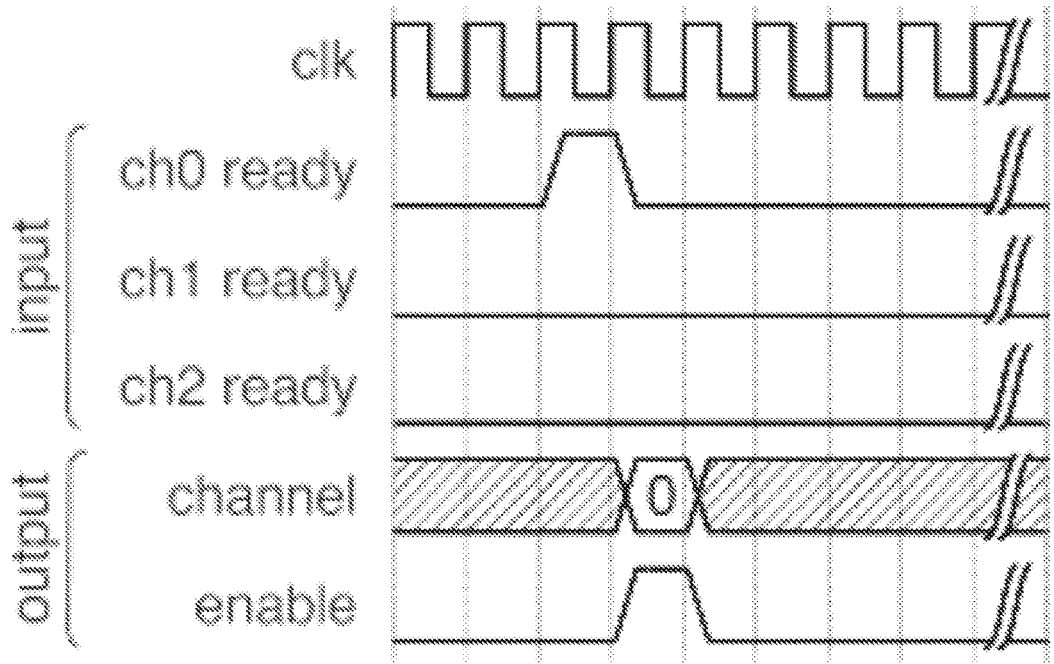

The load balancer pattern delegates a message to exactly one of several message channels using a load balancing strategy (e.g., uniform distribution). Like the content-based router, it is read-only and non-message-generating. Similar to the content-based router, the load balancer maps from a message to a message channel. Only this time, the channel identifier is determined by a load-balancing logic, configured through user code. Instead of a load distribution, the readReady signal is used for back-pressure to determine which channel is currently available. The first channel available is selected as the receiving channel. Consequently, the output channel is written and the enable signal is set. The message will be routed accordingly. FIG. 3B is a graph illustrating behavior of a load balancer, according to an example embodiment.

The splitter pattern processes a message that contains multiple elements, each of which may be processed in a different way. Therefore, the inbound message is split into a number of smaller messages according to a user-defined expression (e.g., message cardinality with a channel cardinality of 1:1. While the splitter is message-generating, it does not add new data to the n outbound messages.

The splitter splits parts of a message into smaller parts similar to single elements of an iterable. There are splitter configurations with data structures of the forms head, iterable, and tail. For each entry in an iterable, a new message has to be created, consisting of the common head entries, one entry from the iterable, and the common tail entries. In these cases, the head is remembered and added before each element from the iterable. If there is an element after the iterable, called a tail, that is to be added the streaming is limited. Thus, the tail is unknown to the splitter until the end of the message, which means that the first new message would is to be buffered until the tail arrived. As in the case of the router, a synchronization point may be used to add the tail part to each of the smaller messages.

Figure 3C:
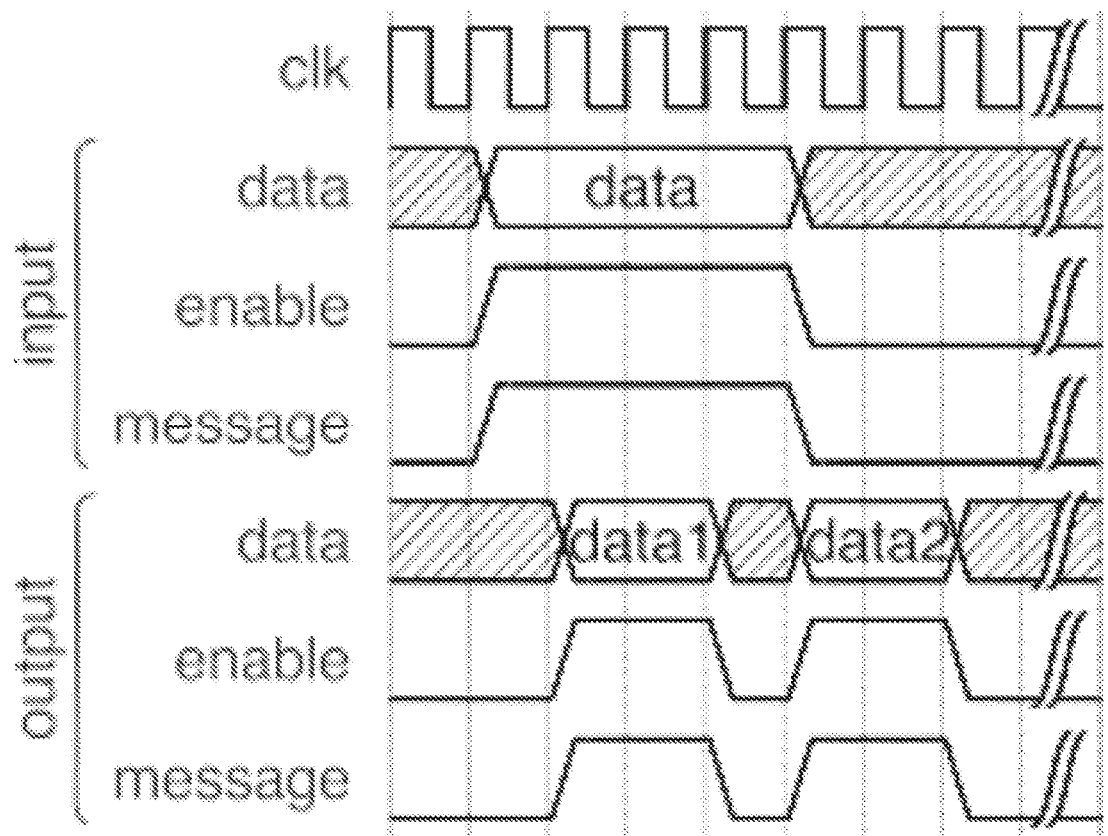

The splitter maps one message to multiple messages. FIG. 3C is a graph illustrating behavior of a splitter, according to an example embodiment. As shown, when the messages arrives and the data is valid, the user-defined split expression is executed, which leads to several messages. The splitter inserts a clock cycle where the message signal is set to low and no data is sent in between the split messages.

The aggregator pattern combines a number of messages into one based on a completion condition based on a time or a number of messages. Hence it has a message cardinality of n:1 and a channel cardinality of 1:1, and is message-generating; however, it only combines data from the inbound messages into a single outbound message. The aggregator waits until the last message arrives to close the new message. Hence, the aggregator shows buffered streaming semantics on a streaming window, which is defined by the completion condition of the aggregator.

The aggregator maps from multiple messages to one message. Depending on the messages, the aggregator may only close the gaps between successive pairs of the multiple messages, or may combine them in a new way (e.g., forwarding the common header of the messages and then the body of each one).

Figure 3D:
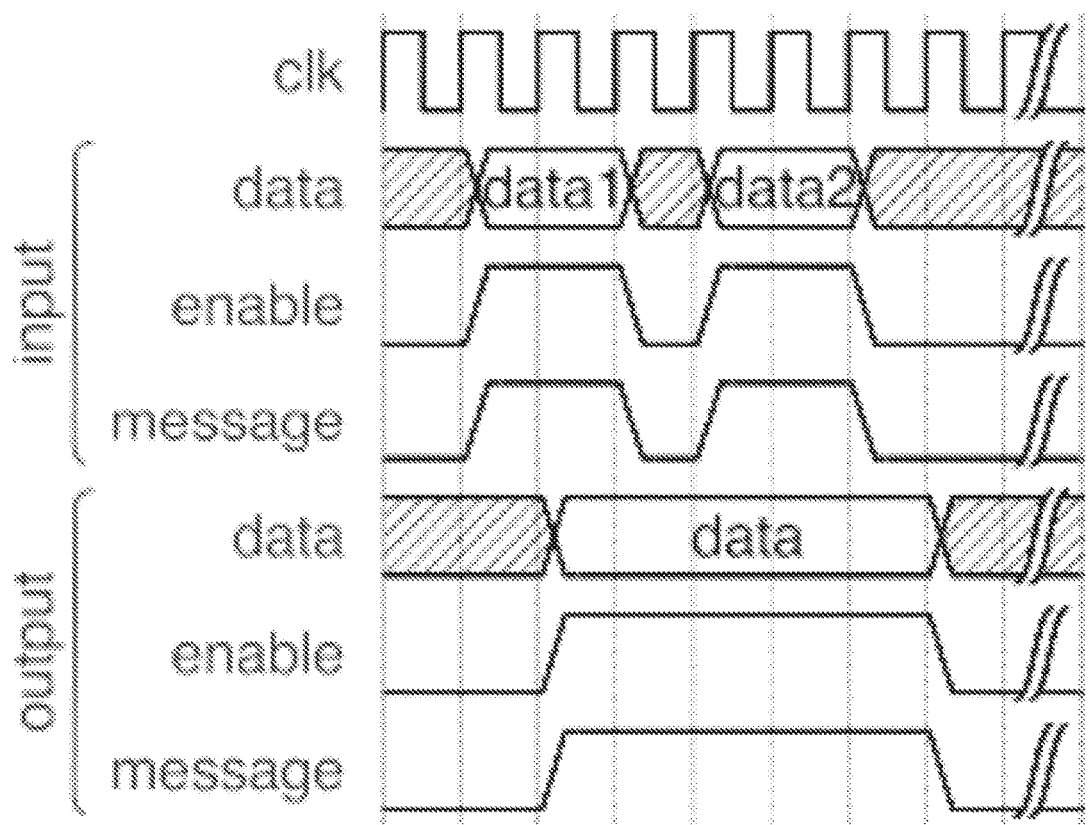

FIG. 3D is a graph illustrating behavior of an aggregator, according to an example embodiment. In FIG. 3D, data arriving in separate messages are combined into one message by setting the message signal to high as long as there are messages arriving that are to be combined into the outbound message.

The join router is a structural pattern to combine several control flows into one. This leads to a channel cardinality of n:1 and a message cardinality of 1:1. The join router maps from channel to channel, but without any additional logic (e.g., as in the load balancer case). The join router checks whether there are messages on the inbound channels and whether the outbound channel is free (e.g., readReady high).

Example Message Transformation Patterns

Message transformation patterns are used to translate message content to make it understandable for its receiving processor or endpoint. Transformation patterns include a content enricher and a message translator, for example. Transformation patterns have a channel cardinality and a message cardinality of 1:1. They do not generate new messages, but modify the current one.

The content enricher pattern adds content to an existing message, if the message originator does not provide all the necessary data items. The enrichment may, for example, be done (a) statically, (b) from the message itself, or (c) from an external source (e.g., the on-board RAM).

Figure 3E:
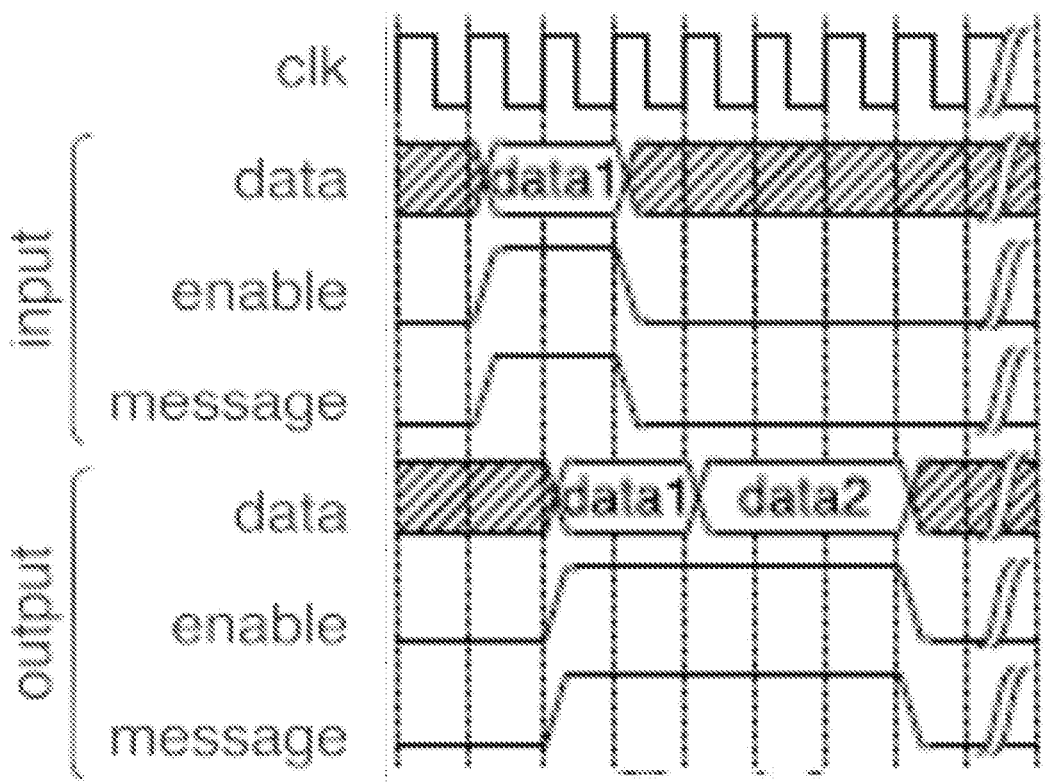

The content enricher maps one message to another, while inserting data into the inbound message. FIG. 3E is a graph illustrating behavior of a content enricher, according to an example embodiment. FIG. 3E shows the processing semantics for a message with data1, to which additional data is added, by a user-defined expression, as data2. The message and the enable signals are set to high.

The message translator pattern converts the structure of the inbound message into one understood by the receiving endpoint (e.g., message endpoint 206). This includes filtering content, which covers the content filter pattern. In instances of many-to-one field translations, parts of the data may be buffered for later lookup and assignment.

Figure 3F:
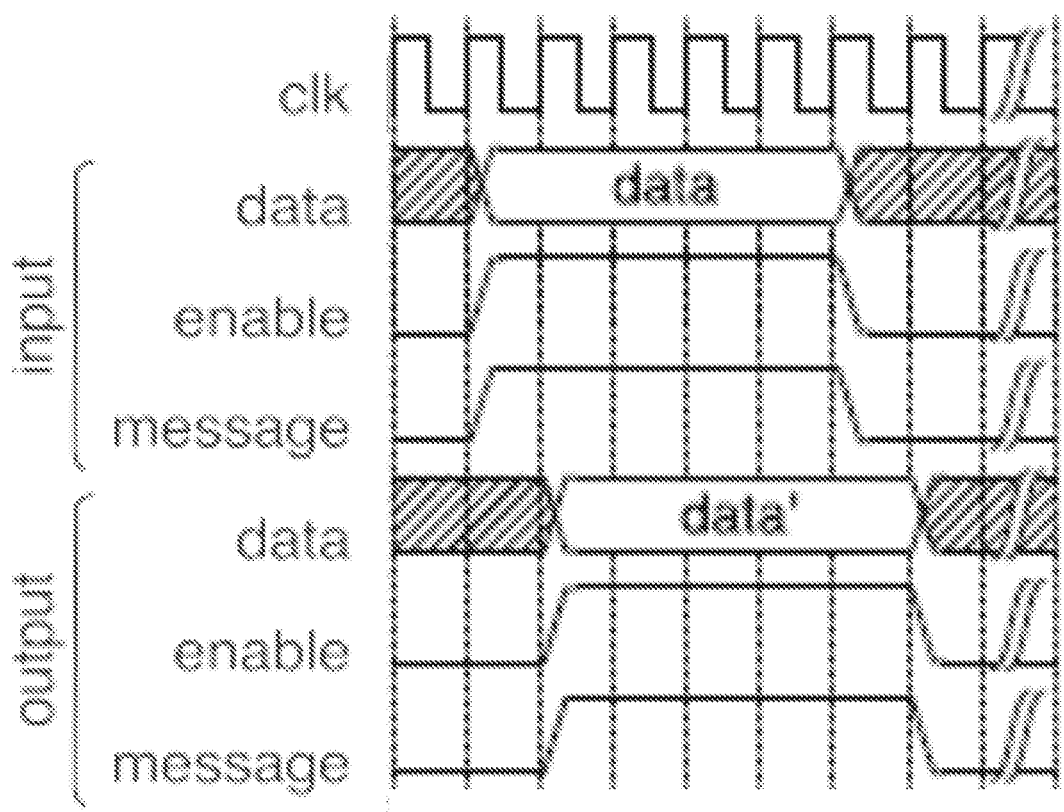

FIG. 3F is a graph illustrating behavior of the message translator, according to an example embodiment. The message translator maps one message to another, while reorganizing the data in the inbound message using user-defined expressions. These complex expressions are not shown explicitly in FIG. 3F, since it only shows the behavior for the interaction with the user code, which returns the modified message content as data. As shown, the message and the enable signals are set to high.

Example Hardware Templates

In synthesizing the forgoing streaming integration patterns to the FPGA 100, the streaming integration patterns may be arranged into three classes of behavior (referred to as "templates") based on commonalties in the patterns. In this way, an optimal utilization of the FPGA 100 hardware and increased throughput may be achieved. The classification of these streaming integration patterns into templates may be based on various implementation criteria for each pattern (e.g., mapping to FPGAs). More specifically, the classifications of these streaming integration patterns may be based on interaction with user-defined conditions: predicates and expressions. In particular, the streaming integration patterns may be classified into the following: an Expression Template (ET); a Predicate Template (PT); and a No User Template (NUT).

The ET combines all patterns that conduct a "message to message" mapping. Such patterns execute more complex expressions, which are provided by the user, while working directly with the data line. An expression in the context of the ET includes a user-defined function that takes a set of messages and, in some cases, additional data and combines them into one or multiple messages. Expressions cover the user-defined functionality of the splitter, aggregator, message translator, content enricher, and content filter. Accordingly, the ET applies to the splitter, aggregator, content enricher, and message translator patterns.

Figure 4:
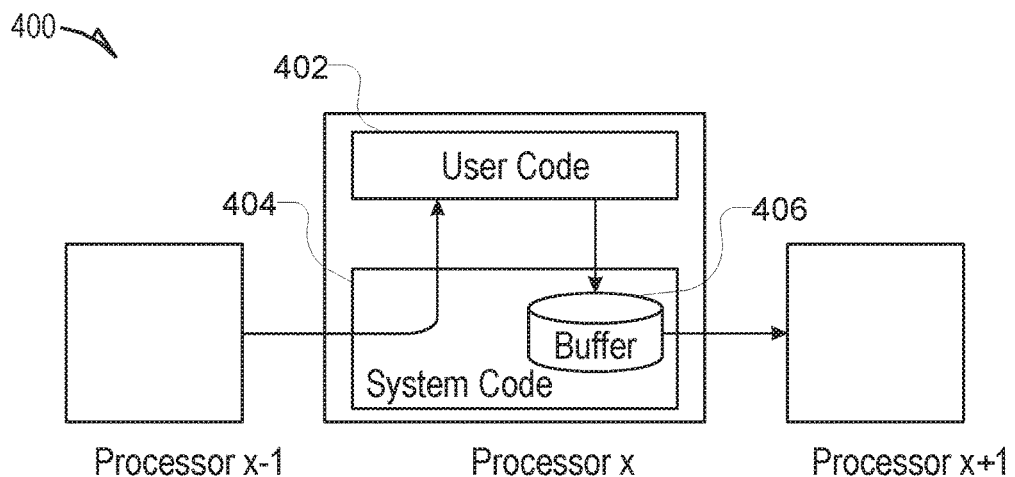
FIG. 4 is a diagram illustrating functional components of an expression template (ET) for implementing various streaming integration patterns as part of the integration system of FIG. 2, according to an example embodiment.

FIG. 4 illustrates functional components of an ET 400 for implementing the splitter, aggregator, content enricher, and message translator patterns on the FPGA 100, according to an example embodiment. The ET 400 has a message channel cardinality of 1:1. The message cardinality may vary. An expression is encapsulated in user code 402. The user code 402 varies depending on the pattern it implements and the specific implementation details of the pattern. While the user code 402 is not fixed, system code 404 remains the same for all instances of the ET 400.

In the context of the ET 400, expressions work directly with the data and the control signals on the message channel. Thus, the message channel is routed from processor x−1 through the system code 404 to the user code 402. After the user code 402 modifies the data and control signals on the message channel, the data and control signals are routed back to the system code 404, where it is written into a buffer 406. Besides the inbound and the outbound message channels, the user code 402 is connected to the clock signal of the system code 404 and passes a readReady signal back to the system code 404, which is AND combined with the system code 404's readReady signal. When both the user code 402 and the system code 404 are ready, the readReady signal to processor x−1 is set to high.

The readReady signal of the system code 404 is formed from two conditions. When there is no data in the buffer 406, the system code 404 is ready. Otherwise, if there is data in the buffer 406 and the data in the buffer 406 is currently being streamed to processor x+1, the system code 404 is ready. The buffer 406 will be empty when processor x+1 has fully read the message, and processor x+1 cannot stop the transmission of the message once the streaming has started. A message is read from the buffer 406 in the system code 404 when the readReady signal of processor x+1 is high and there is a message in the buffer 406. The data from the buffer 406 is read until the currently streamed message ends. Then the system code 404 waits until the readReady signal from processor x+1 is high again.

Pattern-specific signals and components may be directly attached to the user code 402, because the ET 400 is universal for all patterns it supports (e.g., splitter, aggregator, content enricher, and message translator patterns). For example, the pattern-specific signals and components may include the id generator when the ET 400 is used as a splitter pattern. As another example, the pattern-specific signals and components may include an external data source when the ET 400 is used as a content enricher.

The PT includes patterns that conduct a "message to channel" mapping by executing mostly simpler conditions such as predicates. Such patterns set the message and channel signals. In contrast to the ET, the PT operates on predicates. In the context of the PT, a predicate takes a message and returns an indication of whether the message matches a predicate's condition. Accordingly, the PT applies to the content-based router, the message filter, and the load balancer patterns.

Figure 5:
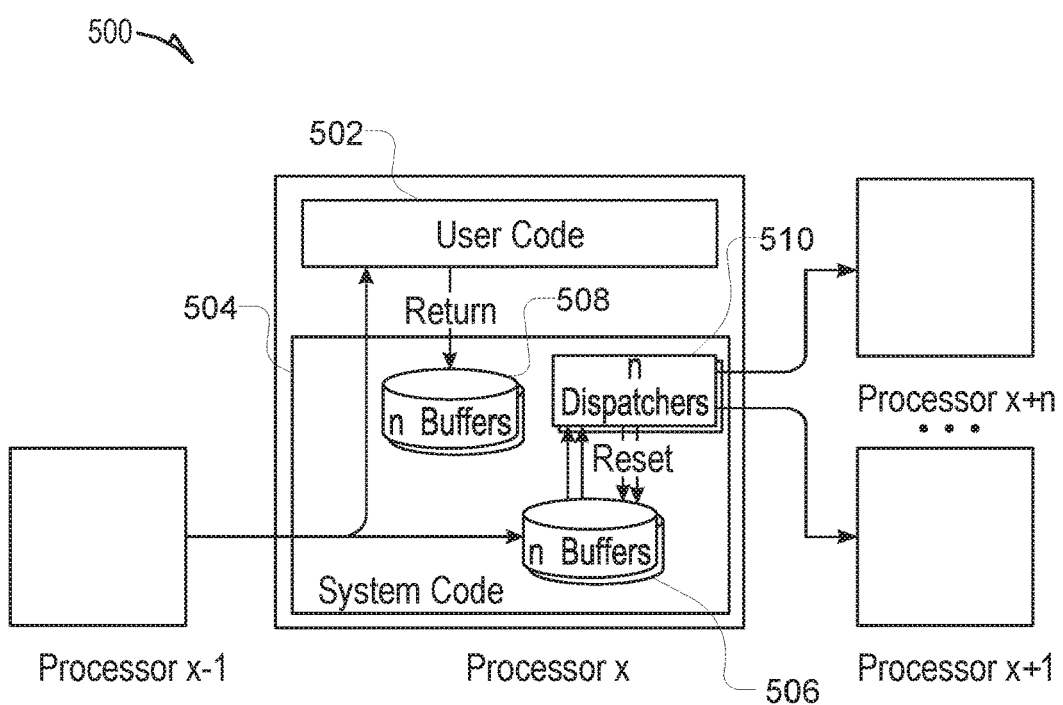
FIG. 5 is a diagram illustrating functional components of a predicate template (PT) for implementing various streaming integration patterns as part of the integration system of FIG. 2, according to an example embodiment.

FIG. 5 illustrates functional components of a PT 500 for implementing the content-based router, the message filter, and the load balancer patterns on the FPGA 100, according to an example embodiment. While the PT 500 has a message cardinality of 1:1, it has a message channel cardinality of 1:n. A predicate is encapsulated in user code 502. While the user code 502 changes, system code 504 does not, independent of the pattern the template implements.

As shown, an inbound message channel is split and routed to the user code 502 and directly into n buffers 506. Because the PT 500 has n outbound message channels, it may include n different clock domains that it may stream to. Thus, for every possible clock domain, a buffer is included.

The user code 502 returns a set of signals to signify the channel the message will be routed to. Hence the value of a return signal may be in the range of 1 to n. When the return signal is set, an enable signal is also set. The return signal indicates that a valid route is on the return signal. The return signal is then passed into the n buffers 508. The return signal is passed into the clock domain of the receiving filter.

For every processor there may be a dispatcher 510, which is located in the clock domain of the processor. Each dispatcher 510 checks if the return signal value is equal to the number of its message channel. If it is equal, the dispatcher 510 streams the message to the processor from the buffer 506, as soon as the processor's readReady signal is high. If it is not equal, the dispatcher 510 sets the reset signal that connects the dispatcher 510 and the respective buffer 506 to high, until the buffer 506 is reset.

Besides the mentioned interface between the user code 502 and the system code 504, the user code 502 passes a readReady signal back to the system code 504. This may be combined with the readReady signal of the system code 504 (e.g., an AND combination of the readReady signals of the dispatcher 510). If a dispatcher 510's buffer content is currently being streamed to a processor or the buffer 506 is empty, the dispatcher 510 is ready to read. Since then buffers 506 are reset instead of flushed to the next message, the corresponding dispatcher 510 is not ready to read while the reset signal is high.

In the context of the PT 500, pattern-specific signals and components are directly attached to the user code 502, because the PT 500 is universal for all pattern it supports. This can be the early out when the PT 500 is used as a message filter pattern, or a readReady signal when the PT 500 is used as a load balancer.

Figure 6:
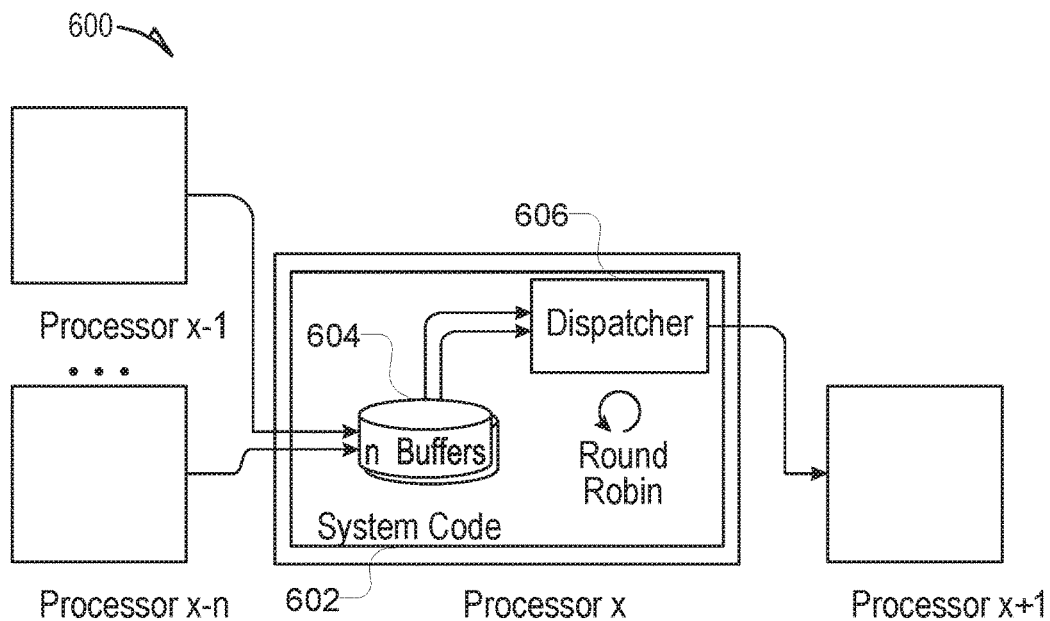
FIG. 6 is a diagram illustrating functional components of a no user template (NUT) for implementing various streaming integration patterns as part of the integration system of FIG. 2, according to an example embodiment.

The NUT conducts a "channel to channel" mapping and does not evaluate any user-defined conditions. Accordingly, the NUT applies to the join router. FIG. 6 is a diagram illustrating functional components of a NUT 600 for implementing the join router pattern on the FPGA 100, according to an example embodiment.

The NUT 600 receives messages from n message channels at the same time, which are each put into one of n buffers 602 of system code 604. A dispatcher 606 reads each of the buffers 602 by employing a round-robin fetch strategy. The NUT 600 includes a counter variable that saves the last buffer (e.g., one of the buffers 602) that was read from. When the readReady signal of processor x+1 is high, the counter variable gets incremented as long as there is no data in the buffer 602 with the index equal to the counter value. When a buffer 602 with a message in it is found, the message is put out on the outbound message channel. When the counter exceeds n, it wraps around to 1 again. For each buffer 602 there is a readReady signal that is high when the buffer 602 is empty or the message in the buffer 602 is currently being streamed to processor x+1.

Example Message Processing

The message processing is defined by predicates and expressions as user code. Although the messages are transferred as sequences of bytes, the messages may have arbitrary message types (e.g., simple types such as integer, or complex types such as JSON). For example, JSON messages can be evaluated by a JSONPath predicate, which may in turn be implemented as an automaton. When parsing JSON messages, an automaton with a JSON-specific alphabet (e.g., for tokens and nodes) may be assumed. For handling hierarchical messages, a deterministic automaton may be assumed to include a start state to an inner node (e.g., object, array) with transitions to an inner and leaf nodes, denoting simple typed values or complex types, such as object for arrays and name/value pairs for objects.

Figure 7:
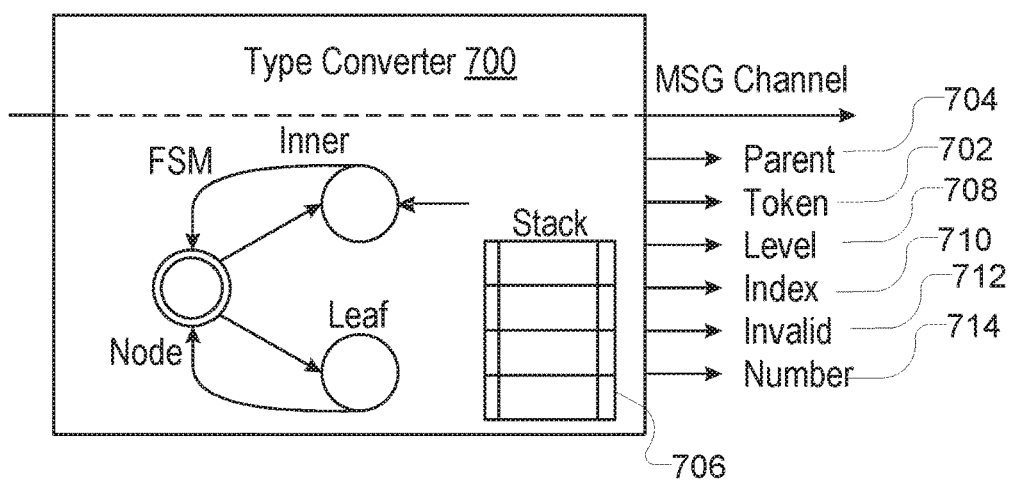
FIG. 7 is a diagram illustrating an outbound interface of a type converter for hierarchical data structures, according to an example embodiment.

FIG. 7 is a diagram illustrating an outbound interface of a type converter 700 for hierarchical data structures, according to an example embodiment. In FIG. 7, a token signal 702 indicates a current token (e.g., string, quote, comma), which depends on the current state of the automaton. A parent signal 704 gives the type of a parent node (e.g., object or array). The parent signal 704 is set when a new inner node is encountered and the old value is to be pushed to a stack 706, which is popped when the new inner node ends. A level signal 708 denotes a pointer in the hierarchical data structure, and an index signal 710 denotes the index of the node in the current level of the hierarchy. The level signal 708 is increased and decreased as values are pushed to and popped from the stack 706, and the index signal 710 is increased when a new node is encountered, and the index signal 710 propagated to the stack 706 together with the parent signal 704. An invalid signal 712 indicates a malformed structure. A number signal 714 is specific to embodiments corresponding to a JSON parser. The number signal 714 passes a value for convenience, if the current token is a number.

Figure 8A:
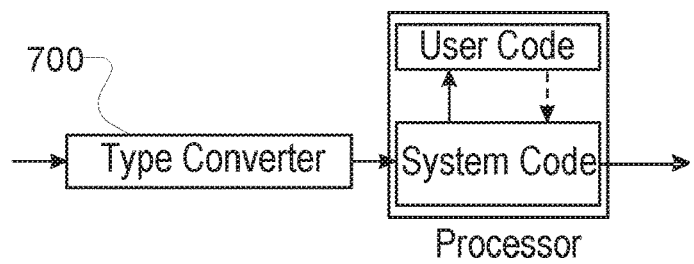
FIG. 8A is a block diagram illustrating type converter placement in an integration flow, according to an example embodiment.

As shown in FIG. 8A, the type converter 700 may be placed globally as the first item in the pipeline, consistent with some embodiments. In this embodiment, only one type converter 700 inspects the message one time and outputs metadata for the message onto the message channel. However, the metadata may be transferred over the message channel by treating it as message data and also transferring it over the data bus, or by adding type-specific signals to the message channel.

Figure 8B:
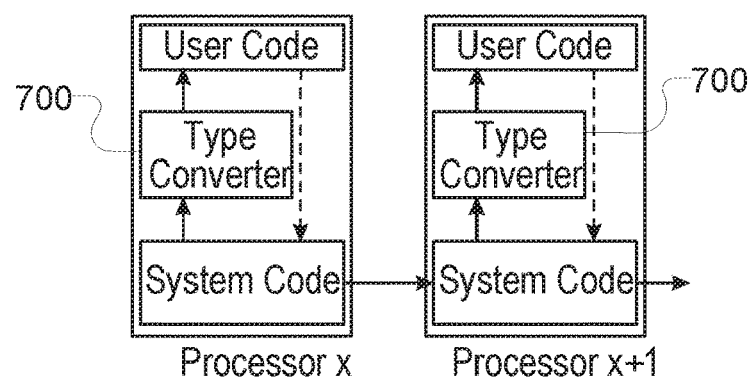
FIG. 8B is a block diagram illustrating type converter placement in an integration flow, according to an alternative example embodiment.

In an alternative embodiment illustrated in FIG. 8B, type converters 700 may be placed locally, between the system code and the user code. The dashed lines in FIG. 8B are to abstract from the returned value of the user code (e.g., ET: message channel, PT: channel and enable). The solid lines are the type metadata lines, exiting the type converter 700s. This approach may save resources by saving buffer space and omitting the type converter 700s where they are not needed. Furthermore, this approach provides more flexibility than the above-referenced approach, because multiple different type converter 700s can be placed in the same pipeline.

After the type conversion process is complete, a predicate or expression may be executed. In some embodiments, the user code may be implemented directly in VHDL, while in other embodiments, a general purpose JSONPath-to-VHDL translator may be employed. As an example, TABLE 1 illustrated below shows how a JSONPath predicate can be implemented in VHDL as a condition for a content-based router.

TABLE 1

| Listing 1: Match field | Listing 2: Eval. Cond. |
|---|---|
| 1 if en='1' and token=NAME | 1 if field='1' and en='1' |
| 2   then | 2     and data=COMMA then |
| 3   if data=otprice(index) | 3     channel <=0; |
| 4     then | 4 -- $[?(0.OTPRICE<100000)] |
| 5       index <=index + 1; | 5     if number <100000 then |
| 6     if index=otpriceLen-1 | 6       channel <=1; |
| 7       then | 7     end if; channelEn <='1'; |
| 8       field <='1'; index <=0; | 8 end if; |
| 9 end if; end if; end if; | |

The example above involves a converted JSON message, which means that the enable (in the code shortened to "en") and data signals are those of the message channel, and the token (List. 1, line 1) and number signals come from the type converter. The code in Table 1 is located inside a VHDL process, triggered by the clock that also drives the data and enable signals. The incoming data is compared to the string "otprice" (List. 1, line 3) if the whole string matched (List. 1, line 6), the field signal is set high (List. 1, line 8). In the clock cycle after the whole total price amount was read (e.g., the data is a comma that is the end of every line), the signal number is compared to 100,000 (in List. 2, line 5). The default channel is 0, and if the number is smaller, the message is routed to channel 1.

Figure 9:
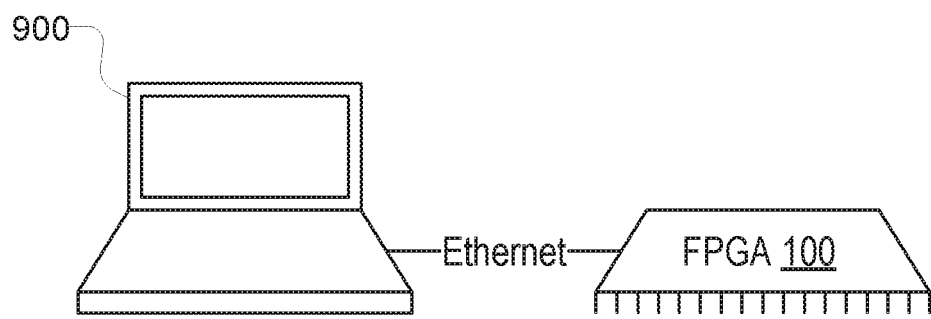
FIG. 9 is a diagrammatic representation of a machine in the example form of a computer system coupled to an FPGA for purposes of synthesizing streaming integration patterns on the FPGA, according to an example embodiment.

FIG. 9 is a diagrammatic representation of a machine in the example form of a computer system 900 coupled to the FPGA 100 for purposes of implementing streaming integration patterns on the FPGA 100. The integration system 102, including each of the templates (e.g., ET 400, PT 500, and NUT 600), may be described (e.g., by a user) in a hardware description language (e.g., VHDL or Verilog) using the computer system 900. A file containing the hardware description is transformed (e.g., compiled, synthesized, placed, and routed) using specialized software tools (e.g., compiling, synthesizing, and placing and routing programs executing on the computer system 900) into configuration data (e.g., an FPGA program) to be loaded by the FPGA 100. The computer system 900 may communicate the configuration data (e.g., a compiled, synthesized, placed, and routed FPGA program) to a machine-readable medium (e.g., a memory component such as electrically erasable programmable read-only memory (EEPROM)) of the FPGA 100, and when the configuration data is loaded by the FPGA 100, the FPGA 100 is configured to include the integration system 102.

Figure 10:
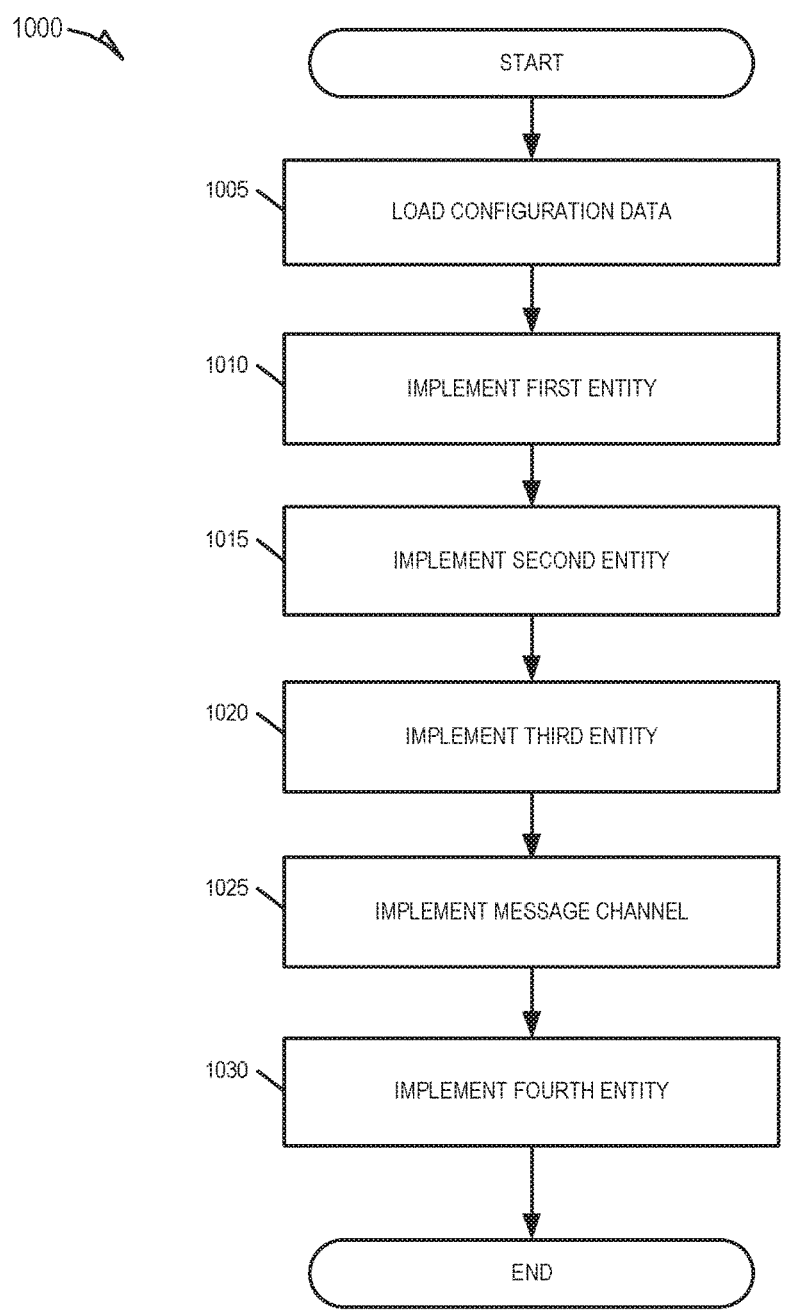
FIG. 10 is a flow chart illustrating operations of a method for configuring the FPGA to include the functional components of the integration system of FIG. 2, according to an example embodiment.

FIG. 10 is a flow chart illustrating operations of a method 1000 for configuring the FPGA 100 to include the functional components of the integration system 102 discussed above with reference to FIG. 2, according to an example embodiment. At operation 1005, the FPGA 100 loads configuration data (e.g., a compiled, synthesized, placed, and routed FPGA program) received from the computer system 900. The configuration data may be loaded into a machine-readable medium (e.g., memory such as EEPROM) included on or connected to the FPGA 100. The configuration data includes a hardware description of the integration system 102 to be implemented on the FPGA 100.

At operation 1010, the FPGA 100 implements a first entity on a first portion of the FPGA 100 in accordance with the configuration data. The first entity corresponds to a first channel adapter (e.g., channel adapter 212) to receive input data written by a first message endpoint (e.g., message endpoint 204).

At operation 1015, the FPGA 100 implements a second entity on a second portion of the FPGA 100 in accordance with the configuration data. The second entity corresponds to a first message processor (e.g., message processor 208) configured to perform a first message processing operation (e.g., routing or transformation) on messages received from the first channel adapter. The first message processor may include or correspond to any one of the ET 400, PT 500, or NUT 600 used to implement various streaming semantics on the FPGA 100. Accordingly, the configuration data may include a hardware description of each of the ET 400, PT 500, or NUT 600, and may thus configure the second portion of the FPGA 100 to include any one of the ET 400, PT 500, or NUT 600.

At operation 1020, the FPGA 100 implements a third entity on a third portion of the FPGA 100 in accordance with the configuration data. The third entity corresponds to a second message processor (e.g., message processor 210) configured to perform a second message processing operation (e.g., routing or transformation) on messages received from the first message processor. Like the first message processor, the second message processor may include or correspond to any one of the ET 400, PT 500, or NUT 600 used to implement various streaming semantics on the FPGA 100. Accordingly, as discussed above, the configuration data may include a hardware description of each of the ET 400, PT 500, or NUT 600, and may thus configure the third portion of the FPGA 100 to include any one of the ET 400, PT 500, or NUT 600.

At operation 1025, the FPGA 100 implements a message channel (e.g., the message channel 202) in accordance with the configuration data. The message channel facilitates data exchanges between the first and second message processors. The message channel includes several data lines (e.g., hard-wired connections) to facilitate communication between the message processors. For example, the message channel may include: an id line for communicating a unique identifier of the message; a length line for communicating a length of the message; a data line for communicating the message body (e.g., that includes the input data received from a message endpoint such as an integrated application); a message line to communicate an indication that a message is being sent over the message channel; and an enable line for communicating when valid data is on the message channel.

At operation 1030, the FPGA 100 implements a fourth entity on a fourth portion of the FPGA 100. The fourth entity corresponds to a second channel adapter (e.g., channel adapter 214) configured to forward output data to a second message endpoint (e.g., message endpoint 206) for further processing.

Examples

Example 1 is a system comprising a reconfigurable logic device; and a machine-readable medium to store configuration data that configures the reconfigurable logic device to comprise: a first channel adapter configured to receive input data written by a first message endpoint; a first message processor coupled to the first channel adapter, the first message processor configured to perform a first message processing operation on messages received from the first channel adapter, the messages including the input data; a second message processor communicatively coupled to the first message processor, the second message processor configured to perform a second message processing operation on messages received from the first message processor; a message channel comprising a plurality of data lines to facilitate communication between the first and second message processors; and a second channel adapter coupled to the second message processor, the second channel adapter configured to forward output data to a second message endpoint for further processing.

In example 2, the plurality of data lines of the message channel of example 1 can optionally include: an identifier data line for communicating a first signal corresponding to a unique identifier of a message; a message length data line for communicating a second signal corresponding to a message length; one or more message body data lines for communicating a message body that includes the input data; a message data line for communicating a third signal indicating message transmission on the message channel; and an enable data line for communicating a fourth signal indicating a message validity.

In example 3, the plurality of data lines of examples 1-2 can optionally include a ready data line for communicating an indication from the second message processor to the first message processor that the second message processor is available to process message data.

In example 4, the first message processor of examples 1-3 can optionally include a buffer to store the message data in response to receiving an indication that the second message processor is unavailable to process the message data.

In example 5, the first and second message process operations of examples 1-4 can optionally include at least one of a message routing operation and a message transformation operation.

In example 6, at least one of the first message processor and the second message processor of examples 1-5 can be optionally configured to include an expression template for implementing one or more enterprise integration patterns configured to perform one or more message-to-message mapping operations.

In example 7, the subject matter of examples 1-6 can optionally include a first component including an expression, the expression including a user-defined function, the first component configured to modify the input data and a set of control signals on the message channel according to the user-defined function; and a second component including a buffer, the input data and the set of control signals being routed through the second component upon being modified, the second component configured to write the input data and the set of control signals to the buffer.

In example 8, the subject matter of examples 1-7 can optionally include at least one of: a splitter pattern, an aggregator pattern, a content enricher pattern, and a message translator pattern.

In example 9, at least one of the first message processor and the second message processor of examples 1-8 is configured to include a predicate template for implementing one or more enterprise integration patterns configured to perform one or more message-to-channel mapping operations.

In example 10, the subject matter of examples 1-9 can optionally include a first component configured to determine whether a message satisfies a predicate condition, the first component further configured to return a set of signals based on a result of determining whether the message satisfies the predicate condition, the set of signals specifying a routing channel from among a plurality of outbound channels to which the message is to be routed; and a second component including multiple buffers to store messages received from a plurality of inbound channels, each buffer corresponding to a particular inbound channel from among the plurality of inbound channels, the buffer storing the message being reset upon transmission of the message on the routing channel.

In example 11, the subject matter of examples 1-10 can optionally include at least one of: a content-based router pattern, a message filter pattern, and a load balancer pattern.

In example 12, at least one of the first message processor and the second message processor of examples 1-11 is optionally configured to include a no user template for implementing a join router pattern configured to perform one or more channel-to-channel mapping operations.

In example 13, the subject matter of examples 1-12 can optionally include a first component including a plurality of buffers, each of the buffers to store messages received from one of a plurality of inbound message channels; and a second component configured to read the messages from each of the plurality of buffers in a round robin, the second component further to communicate the messages read from the plurality of buffers on an outbound message channel.

In example 14, the first and second message endpoints of examples 1-13 can optionally correspond to one of a plurality of applications of an integration system.

In example 15, the first channel adaptor of examples 1-14 can be optionally configured to transform the input data written by the first message endpoint into one or more messages; and assign a unique identifier to each of the one or more messages.

In example 16, the second channel adaptor of examples 1-15 can be optionally configured to transform messages received from the second message processor into the output data to be forwarded to the second message endpoint.

In example 17, the reconfigurable logic device of examples 1-16 can optional include an FPGA.

In example 18, the configuration data of examples 1-17 can optionally be generated based on a hardware description language file.

Example 19 is a method comprising: loading, at a reconfigurable logic device, configuration data describing an integration system; implementing, on a first portion of the reconfigurable logic device, a first entity in accordance with the configuration data, the first entity corresponding to a first channel adapter to receive input data written by a first message endpoint; implementing, on a second portion of the reconfigurable logic device, a second entity in accordance with the configuration data, the second entity corresponding to a first message processor coupled to the first channel adapter, the first message processor configured to perform a first message processing operation on messages received from the first channel adapter, the messages including the input data; implementing, on a third portion of the reconfigurable logic device, a third entity in accordance with the configuration data, the third entity corresponding to a second message processor communicatively coupled to the first message processor, the second message processor configured to perform a second message processing operation on messages received from the first message processor; implementing, on the reconfigurable logic device, a message channel in accordance with the configuration data, the message channel comprising a plurality of data lines to facilitate communication between the first and second message processors; and implementing, on a fourth portion of the reconfigurable logic device, a fourth entity in accordance with the configuration data, the fourth entity corresponding to a second channel adapter coupled to the second message processor, the second channel adapter configured to forward output data to a second message endpoint for further processing.

Example 20 is a non-transitory machine-readable medium storing configuration data, the configuration data, when loaded by a reconfigurable logic device, causing the reconfigurable logic device to perform operations comprising: implementing, on a first portion of the reconfigurable logic device, a first entity in accordance with the configuration data, the first entity corresponding to a first channel adapter to receive input data written by a first message endpoint; implementing, on a second portion of the reconfigurable logic device, a second entity in accordance with the configuration data, the second entity corresponding to a first message processor coupled to the first channel adapter, the first message processor configured to perform a first message processing operation on messages received from the first channel adapter, the messages including the input data; implementing, on a third portion of the reconfigurable logic device, a third entity in accordance with the configuration data, the third entity corresponding to a second message processor communicatively coupled to the first message processor, the second message processor configured to perform a second message processing operation on messages received from the first message processor; implementing, on the reconfigurable logic device, a message channel in accordance with the configuration data, the message channel comprising a plurality of data lines to facilitate communication between the first and second message processors; and implementing, on a fourth portion of the reconfigurable logic device, a fourth entity in accordance with the configuration data, the fourth entity corresponding to a second channel adapter coupled to the second message processor, the second channel adapter configured to forward output data to a second message endpoint for further processing.

The term "machine-readable medium" may include a single medium or multiple media that store one or more data structures or instructions such as configuration data. The term "machine-readable medium" shall also be taken to include any tangible medium that is capable of storing and encoding instructions (e.g., configuration data) for execution by a machine (e.g., an FPGA) and that cause the machine to perform any one or more of the methodologies of the present disclosure, or that is capable of storing or encoding data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), EEPROM) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

For purposes of this disclosure, the term "entity" includes a tangible unit capable of performing certain operations and may be configured or arranged in a certain manner. For example, an entity may comprise dedicated circuitry or logic that is permanently configured to perform certain operations. An entity may also comprise programmable logic or circuitry that is temporarily configured to perform certain operations. Accordingly, the term "entity" should be understood to encompass a tangible entity, be that an entity that is permanently configured or temporarily configured to operate in a certain manner and/or to perform certain operations described herein.

Entities can provide information to, and receive information from, other entities. Accordingly, the described entities may be regarded as being communicatively coupled. Where multiple of such entities exist contemporaneously, communications may be achieved through signal transmission e.g., over appropriate circuits and buses that connect the entities). In embodiments in which multiple entities are configured or instantiated at different times, communications between or among such entities may be achieved, for example, through the storage and retrieval of information in memory structures to which the multiple entities have access. For example, one entity may perform an operation and store the output of that operation in a memory device to which it is communicatively coupled. A further entity may then, at a later time, access the memory device to retrieve and process the stored output. Entities may also initiate communications with input or output devices, and can operate on a resource (e.g., a collection of information).

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   a reconfigurable logic device; and
   a non-transitory machine-readable medium to store configuration data that configures the reconfigurable logic device to comprise:
   a first channel adapter configured to receive input data written by a first message endpoint;
   a first message processor coupled to the first channel adapter, the first message processor configured to perform a first message processing operation on messages received from the first channel adapter, the messages including the input data;
   a second message processor communicatively coupled to the first message processor, the second message processor configured to perform a second message processing operation on messages received from the first message processor;
   a message channel comprising a plurality of data lines to facilitate communication between the first and second message processors; and
   a second channel adapter coupled to the second message processor, the second channel adapter configured to forward output data to a second message endpoint for further processing.

2. The system of claim 1, wherein the plurality of data lines of the message channel include:
   an identifier data line for communicating a first signal corresponding to a unique identifier of a message;
   a message length data line for communicating a second signal corresponding to a message length;
   one or more message body data lines for communicating a message body that includes the input data;
   a message data line for communicating a third signal indicating message transmission on the message channel; and
   an enable data line for communicating a fourth signal indicating a message validity.

3. The system of claim 1, wherein the plurality of data lines of the message channel include a ready data line for communicating an indication from the second message processor to the first message processor that the second message processor is available to process message data.

4. The system of claim 3, wherein the first message processor includes a buffer to store the message data in response to receiving an indication that the second message processor is unavailable to process the message data.

5. The system of claim 1, wherein the first and second message processing operations include at least one of a message routing operation and a message transformation operation.

6. The system of claim 1, wherein at least one of the first message processor and the second message processor is configured to include an expression template for implementing one or more enterprise integration patterns configured to perform one or more message-to-message mapping operations.

7. The system of claim 6, wherein the expression template includes:
   a first component including an expression, the expression including a user-defined function, the first component configured to modify the input data and a set of control signals on the message channel according to the user-defined function; and
   a second component including a buffer, the input data and the set of control signals being routed through the second component upon being modified, the second component configured to write the input data and the set of control signals to the buffer.

8. The system of claim 6, wherein the one or more enterprise integration patterns include at least one of: a splitter pattern, an aggregator pattern, a content enricher pattern, and a message translator pattern.

9. The system of claim 1, wherein at least one of the first message processor and the second message processor is configured to include a predicate template for implementing one or more enterprise integration patterns configured to perform one or more message-to-channel mapping operations.

10. The system of claim 9, wherein the predicate template includes:
    a first component configured to determine whether a message satisfies a predicate condition, the first component further configured to return a set of signals based on a result of determining whether the message satisfies the predicate condition, the set of signals specifying a routing channel from among a plurality of outbound channels to which the message is to be routed; and
    a second component including multiple buffers to store messages received from a plurality of inbound channels, each buffer corresponding to a particular inbound channel from among the plurality of inbound channels, the buffer storing the message being reset upon transmission of the message on the routing channel.

11. The system of claim 9, wherein the one or more enterprise integration patterns include at least one of: a content-based router pattern, a message filter pattern, and a load balancer pattern.

12. The system of claim 1, wherein at least one of the first message processor and the second message processor is configured to include a no user template for implementing a join router pattern configured to perform one or more channel-to-channel mapping operations.

13. The system of claim 12, wherein the no user template includes:
    a first component including a plurality of buffers, each of the buffers to store messages received from one of a plurality of inbound message channels; and
    a second component configured to read the messages from each of the plurality of buffers in a round robin, the second component further to communicate the messages read from the plurality, of buffers on an outbound message channel.

14. The system of claim 1, wherein the first and second message endpoints each correspond to one of a plurality of applications of an integration system.

15. The system of claim 1, wherein the first channel adapter is further configured to:
    transform the input data written by the first message endpoint into one or more messages; and
    assign a unique identifier to each of the one or more messages.

16. The system of claim 1, wherein the second channel adapter is further configured to transform messages received from the second message processor into the output data to be forwarded to the second message endpoint.

17. The system of claim 1, wherein the reconfigurable logic device is a field programmable gate array (FPGA).

18. The system of claim 1, wherein the configuration data is generated based on a hardware description language file.

19. A method comprising:
    loading, at a reconfigurable logic device, configuration data describing an integration system;
    implementing, on a first portion of the reconfigurable logic device, a first entity in accordance with the configuration data, the first entity corresponding to a first channel adapter to receive input data written by a first message endpoint;
    implementing, on a second portion of the reconfigurable logic device, a second entity in accordance with the configuration data, the second entity corresponding to a first message processor coupled to the first channel adapter, the first message processor configured to perform a first message processing operation on messages received from the first channel adapter, the messages including the input data;
    implementing, on a third portion of the reconfigurable logic device, a third entity in accordance with the configuration data, the third entity corresponding to a second message processor communicatively coupled to the first message processor, the second message processor configured to perform a second message processing operation on messages received from the first message processor;
    implementing, on the reconfigurable logic device, a message channel in accordance with the configuration data, the message channel comprising a plurality of data lines to facilitate communication between the first and second message processors; and
    implementing, on a fourth portion of the reconfigurable logic device, a fourth entity in accordance with the configuration data, the fourth entity corresponding to a second channel adapter coupled to the second message processor; the second channel adapter configured to forward output data to a second message endpoint for further processing.

20. A non-transitory machine-readable medium storing configuration data; the configuration data, when loaded by a reconfigurable logic device, causing the reconfigurable logic device to perform operations comprising:
    implementing, on a first portion of the reconfigurable logic device, a first entity in accordance with the configuration data, the first entity corresponding to a first channel adapter to receive input data written by a first message endpoint;
    implementing, on a second portion of the reconfigurable logic device, a second entity in accordance with the configuration data, the second entity corresponding to a first message processor coupled to the first channel adapter, the first message processor configured to perform a first message processing operation on messages received from the first channel adapter, the messages including the input data;
    implementing, on a third portion of the reconfigurable logic device, a third entity in accordance with the configuration data, the third entity corresponding to a second message processor communicatively coupled to the first message processor, the second message processor configured to perform a second message processing operation on messages received from the first message processor;

implementing, on the reconfigurable logic device, a message channel in accordance with the configuration data, the message channel comprising a plurality of data lines to facilitate communication between the first and second message processors; and implementing, on a fourth portion of the reconfigurable logic device, a fourth entity in accordance with the configuration data, the fourth entity corresponding to a second channel adapter coupled to the second message processor, the second channel adapter configured to forward output data to a second message endpoint for further processing.

* * * * *